United States Patent [19]

Levy

[11] Patent Number: 5,754,633
[45] Date of Patent: May 19, 1998

[54] METHOD FOR ACHIEVING THIRD-NUMBER CALL BILLING

[75] Inventor: Robert Bergman Levy, Huntingdon Valley, Pa.

[73] Assignee: AT&T, Middetown, N.J.

[21] Appl. No.: 659,467

[22] Filed: May 31, 1996

[51] Int. Cl.[6] .................................................. H04M 15/00
[52] U.S. Cl. ........................ 379/114; 379/121; 379/144; 379/222
[58] Field of Search .............................. 379/112, 113, 379/114, 115, 118, 120, 121, 127, 58, 59, 201, 202, 204, 205, 211, 212, 213, 214, 218, 88, 91.01, 91.02, 123, 144, 145

[56] References Cited

U.S. PATENT DOCUMENTS

| | | | |
|---|---|---|---|
| 5,381,467 | 1/1995 | Rosinski et al. | 379/121 |
| 5,414,754 | 5/1995 | Pugh et al. | 379/88 |
| 5,539,807 | 7/1996 | Ghisler et al. | 379/58 |
| 5,646,984 | 7/1997 | Oda | 379/114 |

*Primary Examiner*—Curtis Kuntz
*Assistant Examiner*—Binh K. Tieu
*Attorney, Agent, or Firm*—Robert B. Levy

[57] ABSTRACT

A party (12, 14, 16 and 18) to a telephone call carried by a telecommunications network (10) may effect transfer of the call charges that would otherwise be billed to that party by entering a billing transfer request after the call has been set up. Upon receipt of the billing transfer request, the network verifies whether the subscriber is authorized. If so, then a billing record created upon call set up is transferred to an alternative number designated by the subscriber.

19 Claims, 1 Drawing Sheet

METHOD FOR ACHIEVING THIRD-NUMBER CALL BILLING

TECHNICAL FIELD

This invention relates to a technique for allowing a party responsible for telephone call charges to transfer such charges from one billing number to another number.

BACKGROUND ART

Traditionally, a calling party placing a wire-line toll telephone call incurs a charge that is billed to that party's telephone number. If the called party has agreed to accept the charge in advance of the call being completed, then the charge is billed to the called party's number. In accordance with the teachings of U.S. Pat. No. 5,381,467, issued in the names of Richard Rosinski and Steven Salimando, and assigned to AT&T Corp. (hereinafter incorporated by reference), the charge associated with a wire-line telephone call may be shared between the calling and called parties in advance of the call by a prearranged cost sharing arrangement.

In contrast to wire-line subscribers who generally only pay for calls that they make, wireless subscribers invariably incur a charge for the calls they make as well as for calls they receive. Typically, a wireless subscriber pays for incoming calls at the same rate as for outgoing calls. Subscribers that use their wireless service for both personal and business purposes often incur the difficulty of separating the charges associated with incoming business calls from incoming personal calls since all incoming calls are automatically charged to the subscriber's wireless phone number. Incoming business calls may be reimbursed by the subscriber's employer whereas personal calls are usually not reimbursed. If the wireless service is in the name of the subscriber rather than in the name of the employer, the subscriber must pay all charges, often well in advance of receiving reimbursement for business calls. The delay in receiving reimbursement may discourage some wireless subscribers from using their service for business calls.

Thus, there is a need for a technique that would allow a telephone subscriber to transfer the charge associated with a call to a different number during the course of the call.

BRIEF SUMMARY OF THE INVENTION

Briefly, a method is provided for transferring a charge associated with a telephone call from a first billing number, against which such charges would be ordinarily billed, to an alternative number during the course of the call. In accordance with the invention, a billing record is created in a telecommunication network carrying at least a portion of the call to record charges for the call upon its initiation (i.e., after the call is set up). During the course of the call, the party against whose number the call charges (or at least a portion thereof) would be billed may wish to transfer the billing of the call charges to the alternative number. Under such conditions, the party desiring the transfer generates a billing transfer request that is sent to the network. Upon receipt of the billing transfer request, the network verifies whether the party has the authority to transfer the charges. If the network determines that the party has such authority, then the billing record is transferred number to the alternate number. In this way, the charges for the call will be billed to the alternative number.

DETAILED DESCRIPTION

Figure 1:
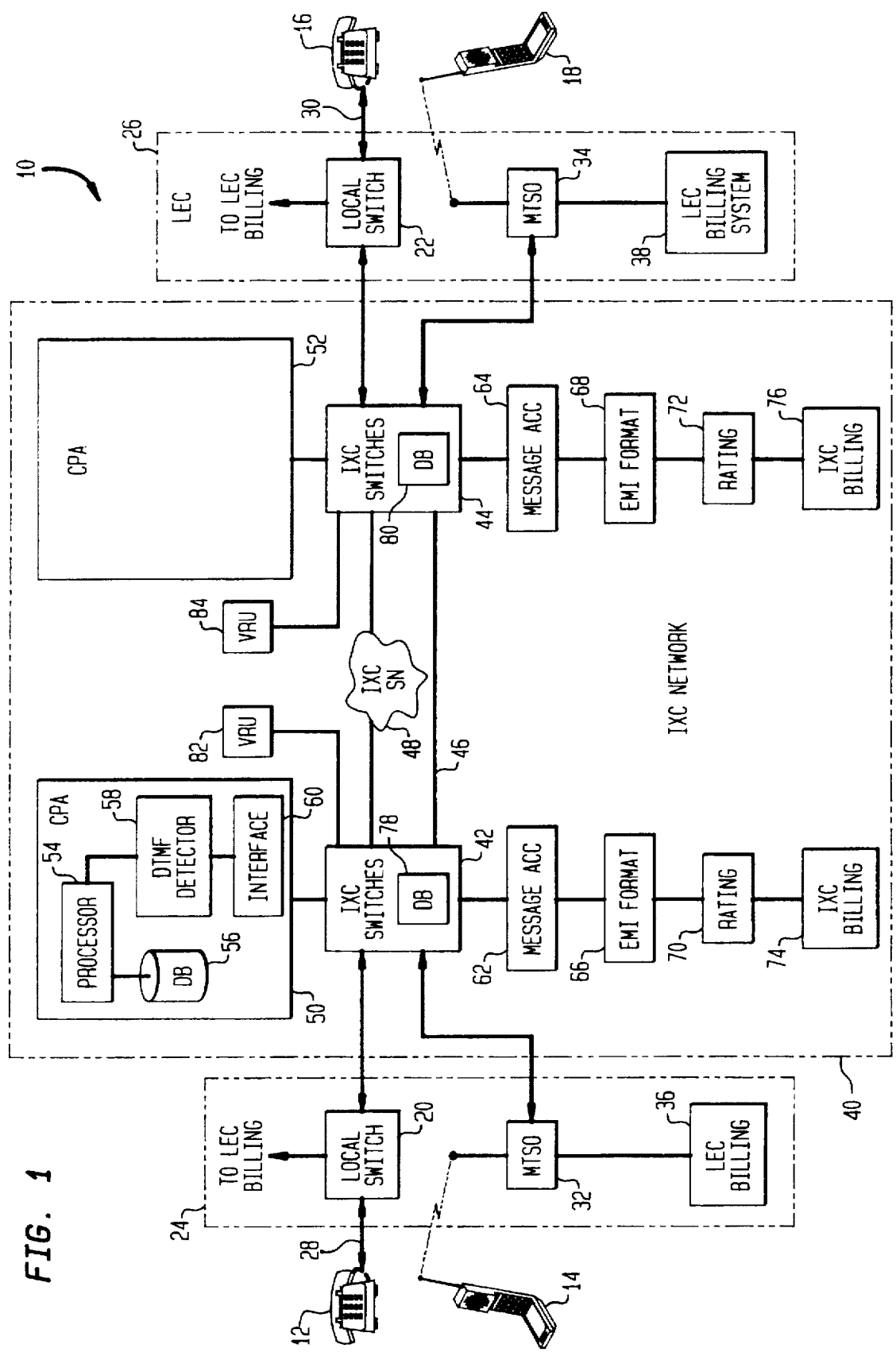
FIG. 1 is an exemplary architecture of a telecommunications network for processing calls in accordance with the invention.

FIG. 1 depicts a telecommunications network 10 for routing telephone calls among two or more subscribers 12, 14, 16 and 18. In the illustrated embodiment, the subscribers 12 and 16 are wire-line subscribers. In other words, each of subscribers 12 and 16 is connected to one of a pair of telephone switches 22 and 24, respectively, associated with one of a pair of Local Exchange Carriers (LECs) 24 and 26, respectively, via wire-lines 28 and 30, respectively. In the illustrated embodiment, the subscribers 14 and 18 are wireless subscribers. Each of the subscribers 14 and 18 makes and receives calls through an individual cell site (not shown) or a succession of cell cites, connected to one of a pair of Mobile Telephone Switching Offices (MTSOs) 32 and 34 associated with the LECs 24 and 26, respectively. Each of the LECs 24 and 26 has billing systems 36 and 38, respectively, coupled to a corresponding one of the switches 20 and 22 and to the MTSOs 32 and 34, respectively. Each of the LEC billing systems 36 and 38 includes a processor and associated data base (not shown) for recording and processing billing information that may be generated by the switch and MTSO of each LEC. Additionally, each of the LEC billing systems 36 and 38 may include one or more printers (not shown) and associated mailing equipment for printing and mailing bills to subscribers.

A call initiated by one of the subscribers 12 and 14 served by the LEC 24 and destined for one of the subscribers 16 and 18 served by the LEC 26 is carried by an Inter-Exchange Carrier (IXC) network 40, such as the IXC network maintained by AT&T. In the illustrated embodiment, the IXC network 40 includes at least two IXC switches 42 and 44, each typically a No. 4ESS switch previously made by AT&T. The IXC switch 42 serves the local switch 20 and MTSO 32 of the LEC 24 whereas the IXC 44 serves the switch 22 and MTSO 34 of the LEC 26. The IXC switches 42 and 44 are interconnected via at least one trunk 48 across which calls pass between the IXC switches. Additionally, the IXC switches 42 and 44 are linked by an IXC signaling network, such as the SS7 network utilized by AT&T, so that control information can pass between the switches. It should be understood that the IXC network 40 may include one or more switches (not shown) that lie between the switches 42 and 44 for routing calls.

Associated with each of the IXC switches 42 and 44 is one of Call Processing Adjuncts (CPAs) 50 and 52, respectively. The CPAs 50 and 52 provide their respective switches 42 and 44 with certain capabilities beyond those afforded by the switch itself. While the CPAs 50 and 52 are shown separate from the IXC switches 42 and 44, respectively, the capability afforded by each CPA could be integrated within the switch.

The CPAs 50 and 52 are identical. Therefore, only the details of CPA 50 will be described. As seen in FIG. 1, the CPA 50 includes a processor 54 coupled to a data base 56 that stores information as well as certain programs for controlling the operation of the CPA. The CPA 50 also includes a Dual-Tone Multi-Frequency (DTMF) detector 58 coupled to the processor 54. The DTMF detector 58 detects DTMF signals entered subscribers in connection with calls carried by the IXC switch 42. An interface 60 couples the processor 54 to the IXC switch 42 to allow for voice and signaling information to pass between the CPA and the switch. In the illustrated embodiment, the CPA 50 is coupled to the IXC switch 42 via an Integrated Services Digital Network (ISDN) line 58 operating at a Primary Rate Interface (PRI) protocol that provides 23 voice (B) channels and one data (D) channel.

Associated with each of the switches 42 and 44 is one of message accumulators 62 and 64, respectively. Each of the message accumulators 62 and 64 functions to poll its corresponding switch to accumulate billing records created by each switch in connection with calls that it processes. The message accumulators 62 and 64 associated with IXC switches 42 and 44, respectively, are coupled to Electronic Message Interface (EMI) formatters 66 and 68, respectively. Each of the EMI formatters 66 and 68 formats the billing records accumulated by the accumulators 62 and 64, respectively, into industry standard message formats. An example of such an industry standard message format is disclosed in the aforementioned U.S. Pat. No. 5,381,467, incorporated by reference herein.

Each of a pair of rating systems 70 and 72 receives the formatted billing records from a corresponding one of the formatters 66 and 68, respectively. Each rating system functions to "rate" each call by computing the appropriate toll charge associated with the call embodied by the just formatted billing record. The toll charge is typically determined in accordance with several factors, including the time-of-day, the origin and destination of the call, as well as whether the call was direct-dialed, a credit-card call or was operator assisted.

Each of the rating systems 70 and 72 is coupled to a separate one of a pair of IXC billing systems 74 and 76. The IXC billing systems 74 and 76 are typically similar to the LEC billing systems 36 and 38 and include a processor and data base (not shown) for recording billing information generated by the rating systems 74 and 76, respectively. Each of the IXC billing systems 74 and 76 has the capability of transferring billing information to the LEC billing systems 36 and 38 for the purpose of enabling the LEC billing systems to generate bills for the subscribers 12, 14, 16 and 18 that include the IXC charges incurred by each subscriber. Alternatively, each of the IXC billing systems 74 and 76 may include printers (not shown) as well as mailing equipment (not shown) for directly mailing bills to subscribers 12, 14, 16 and 18 for any IXC toll charges they may incur.

In the past, when one of the subscribers 12 and 14 initiated a direct dialed call to one of the subscribers 16 and 18, the IXC charges associated with the call were billed to the telephone number of the subscriber making the call. In the illustrated embodiment, the call charges incurred by the subscriber 12 were billed by the IXC billing system 74 to the LEC billing system 36. Once the call began, a subscriber against whose number at least a portion of the call charges were billed had no opportunity to change the billing of the call.

In accordance with the invention, a technique is provided for allowing any of the subscribers 12, 14, 16 and 18 against whose number at least a portion of the call charges would otherwise be billed, to transfer the charges to another number. The technique of the invention is practiced using the network 10 in the following manner. Assume that the subscriber 12 wishes to communicate with the subscriber 16. The subscriber 12 initiates the call by dialing the number of the subscriber 16. In response to digits dialed by the subscriber 12, the local switch 20 sets up a call path to the IXC switch 42 which, in turn, routes the call to the IXC switch 44 by setting up a call path thereto. The IXC switch 44 routes the call to the local switch 22 of the LEC 26 which, in turn, signals the subscriber 16 to answer the call.

Once the call has been set up is now ongoing, (i.e., the subscriber 16 has answered), the subscriber 12 may wish to transfer the billing of the call to an alternative number. For example, the subscriber 12 may wish to bill the call to a business number, or credit card, rather than have the call billed to the subscriber's residential telephone number. Pursuant to the invention, the subscriber 12 effects transfer of the billing of an on-going call by entering an appropriate billing transfer command. In the illustrated embodiment, the billing transfer command is an in-band signal comprising a preselected combination of DTMF signals, such as * B, for example.

The DTMF signals representing the billing transfer command entered by the subscriber 12 are forwarded by the LEC 24 to the IXC switch 42. Upon receipt of the such signals, the CPA 50 translates the signals to determine the action desired by the subscriber. Assuming that the subscriber 12 has entered the proper sequence of DTMF signals to effectuate a billing transfer, the CPA 50 signals the IXC switch 42 of the subscriber's desire to transfer the billing to an alternative number.

To prevent a fraudulent transfer of the call billing to an alternative number for which the subscriber 12 is not authorized, the IXC switch 42 verifies whether the subscriber has such authority. To that end, the IXC switch 42 is provided with a data base 78 that stores information identifying the subscribers that are authorized to transfer billing, and the numbers to which such billing may be transferred. Upon receipt of the billing transfer request, the IXC switch 42 verifies whether the subscriber 12 may properly transfer the call billing to an alternative number. In a similar fashion, the switch 44 contains a data base 80 that stores information about what subscribers are authorized to transfer billing for the purpose of verifying if one of the subscriber 16 and 18 is authorized to effect a billing transfer. Note that the billing transfer authorization could be performed by the CPAs 50 and 52 rather than by the switches 42 and 44, respectively, in accordance with information stored in the data base in each CPA.

There are several ways in which a subscriber's billing transfer request may be verified. One approach would be to store the telephone numbers of all subscribers that are authorized to transfer billing, as well as the alternative numbers to which such billing may be transferred. Upon receipt of a call from the subscriber 12, the IXC switch 42 would compare the number of that subscriber, as provided by ANI, to a list of authorized subscriber numbers. If the subscriber 12 is authorized, then the IXC switch 42 will reassign the billing record created for the on-going call to the alternative number that was previously designated by that subscriber. If desired, the IXC switch 42 may actuate a Voice Response Unit (VRU) 82 to provide a voice acknowledgment to the caller that the billing would be transferred as requested. (IXC switch 44 also has an associated VRU 84 for the same purpose.)

Rather than transfer the billing to a single alternative number that was previously stored, subscribers, such as subscriber 12, may want the flexibility to transfer the billing to one of several numbers. For example, a subscriber may want the ability to transfer the charges to another telephone number, such as a business number, or to a credit card number. To provide such flexibility, the IXC switch 42 (or the switch 44 in the case of the subscribers 16 and 18) could easily actuate its associated one of VRUs 82 and 84 to prompt the subscriber to enter the alternative billing number following entry of the billing transfer command. Alternatively, the calling subscriber could provide such information in connection with the billing transfer command itself, rather than enter such information following a prompt. In that regard, each of the CPAs 50 and 52 would monitor the call billing request entered by a subscriber to detect the alternative billing number following the request itself.

Subscriber verification may also be accomplished by use of a password, such as Personal Identification Number (PIN). Subscribers that are authorized to transfer call billing would be assigned a PIN a record of which would be stored in each of the data bases 78 and 80 or in the data base 56 of each CPA. Following entry by a subscriber of a call billing request, the subscriber would be prompted to enter his/her PIN by an associated one of VRUs 82 and 84. The PIN itself may identify the alternative billing number. Alternatively, the subscriber could also be prompted to enter the alternative billing number. To verify the billing request, each IXC switch, or alternatively, the CPA associated therewith, would compare the subscriber's PIN to the set of stored records. Assuming a match, the IXC switch would effect transfer of the billing record.

As discussed, the billing transfer command is an in-band signal, typically a prescribed sequence of DTMF signals. However, the billing transfer request does not necessarily need to be an in-band signal. For subscribers that enjoy ISDN service, the billing transfer request could an out-of-band signal.

In the illustrated embodiment of FIG. 1, the process of transferring call billing was described in connection with the transfer of inter-exchange (IXC) toll charges that would otherwise be billed to a single subscriber. In accordance with the scheme described in the aforementioned U.S. Pat. No. 5,381,467, a fraction of the call charges may be shared between the parties to the call. Under such circumstances, the above-described call billing technique could be utilized by all of the parties to the call that will be billed for at least some fraction of the call charges. Additionally, billing transfer in accordance with the invention could easily be practiced in connection with intra-exchange calls, especially cellular telephone calls, as well as IXC toll charges. To that end, each of the local switches 20 and 22 and the MTSOs 32 and 34 would need to possess the appropriate functionality, (such as by way of a CPA 50 or 52), to detect and verify a billing transfer request. In this regard, records of subscribers authorized to effect such a billing transfer, would have to be available to each of the local switches 20 and 22 and the MTSOs 34 and 36 (or to the CPAs associated therewith).

The foregoing describes a technique for transferring billing of telephone call charges from a first billing number to an alternative number during the course of the call.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for transferring a charge associated with an on-going telephone call initiated within a telecommunications network to an alternative billing number, comprising the steps of establishing a billing record to record charges for said telephone call;

receiving after set-up said telephone call, a billing transfer request from a party to the call having a first number for effecting a transfer of said billing record to an alternative billing number;

verifying whether said party has the authority to effect transfer of said billing record by determining whether the first number associated with said party corresponds to one of a prescribed set of numbers stored in said network that identify parties authorized to transfer billing records, and if said party has the authority, transferring the billing record associated with the entire call to said alternative number.

2. The method according to claim 1 wherein the first number associated with said party comprises the party's telephone number and wherein the verifying step comprises the steps of identifying said party's telephone number; and comparing said party's telephone number to a list of telephone numbers of parties that are authorized to transfer billing records.

3. The method according to claim 1 wherein the first number associated with said party comprises that party's personal identification and wherein the verifying step comprises the steps of:

prompting said party to enter its personal identification number; and checking whether the personal identification number is valid by comparing said number to a list of valid personal identification numbers.

4. The method according to claim 1 wherein said alternative number is established in accordance with information entered with the billing transfer request.

5. The method according to claim 3 wherein said alternative number is established in accordance with said personal identification number.

6. The method according to claim 1 wherein said alternative number comprises a telephone number.

7. The method according to claim 1 wherein the alternative number comprises a credit card number.

8. The method according to claim 1 wherein the billing transfer request comprises a prescribed sequence of DTMF signals.

9. The method according to claim 8 wherein said prescribed sequence of DTMF signals specifies said alternative number.

10. The method according to claim 1 wherein:

a second party to the call has a second number against which at least a portion of the call charges are billed;

a billing record is established for second party's number; and wherein second party also enters a billing transfer request to transfer the billing associated with said second number to a second alternative number during the course of the call.

11. A method for transferring the billing of a wireless telephone billed to a wireless subscriber from that subscriber's number to an alternative number during the course of the call, comprising the steps of establishing a billing record initially associated with said wireless subscriber's number to record charges for a telephone call associated with said subscriber;

receiving after set-up said telephone call, a signal entered by wireless subscriber for effecting a transfer of said billing record from said subscriber's number to said alternative number;

verifying whether said wireless subscriber has the authority to effect transfer of said billing record by determining whether a number associated with said wireless subscriber corresponds to one of a prescribed list of numbers stored in said network that identify wireless subscribers authorized to transfer billing records, and if said wireless subscriber has the authority, transferring the billing record associated with the entire call to said alternative number.

12. The method according to claim 11 wherein the number associated with said wireless subscriber comprises a personal identification number associated with said wireless subscriber and wherein the verifying step comprises the steps of:

prompting said wireless subscriber to enter its personal identification number; and checking whether the personal identification number is valid by comparing said number to a list of valid personal identification numbers.

13. The method according to claim 12 wherein the verifying step comprises the steps of:

prompting said wireless subscriber to enter a personal identification number;

checking whether the personal identification number is valid.

14. The method according to claim 12 wherein said alternative number is established in accordance with the billing transfer request entered by said wireless subscriber to effect transfer of said billing record.

15. The method according to claim 13 wherein said alternative number is established in accordance with said personal identification number.

16. The method according to claim 1 wherein said alternative number comprises a telephone number.

17. The method according to claim 12 wherein the alternative number comprises a credit card number.

18. The method according to claim 12 wherein the signal entered by said wireless subscriber comprises a prescribed sequence of DTMF signals.

19. The method according to claim 18 wherein said prescribed sequence of DTMF signals specifies said alternative number.

* * * * *